United States Patent
Jiang

(10) Patent No.: US 6,612,033 B1
(45) Date of Patent: Sep. 2, 2003

(54) METHOD FOR MAKING HOLLOW BICYCLE CRANKS

(76) Inventor: Cheng-Xun Jiang, No. 487, Guojung Rd., Dali City, Taichung (TW)

( * ) Notice: Subject to any disclaimer, the term of this patent is extended or adjusted under 35 U.S.C. 154(b) by 0 days.

(21) Appl. No.: 10/097,578

(22) Filed: Mar. 15, 2002

(51) Int. Cl.$^7$ .............................................. B21D 53/88
(52) U.S. Cl. ........................ 29/897.2; 29/527.1; 29/558; 72/356
(58) Field of Search ................................ 29/897.2, 897, 29/527.1, 557, 558, 888.071, 888.092; 72/888.451, 356, 358, 359; 164/98, 137; 280/259; 74/594.1, 594.2, 594.3, 594.4, 594.5, 579 R, 579 E, 579 F

(56) References Cited

U.S. PATENT DOCUMENTS

| | | | | |
|---|---|---|---|---|
| 3,940,969 A | * | 3/1976 | Princehouse | 72/302 |
| 4,061,013 A | * | 12/1977 | Kuc et al. | 72/353.2 |
| 4,602,524 A | * | 7/1986 | Whitten et al. | 74/594.2 |
| 5,623,856 A | * | 4/1997 | Durham | 74/594.1 |
| 6,058,803 A | * | 5/2000 | Yamanaka | 74/594.1 |
| 6,085,405 A | * | 7/2000 | Kao | 29/558 |
| 6,145,184 A | * | 11/2000 | Yamanaka | 29/527.6 |
| 6,195,894 B1 | * | 3/2001 | Mizobe et al. | 29/897.2 |
| 6,227,070 B1 | * | 5/2001 | Mizobe et al. | 74/594.1 |
| 6,314,834 B1 | * | 11/2001 | Smith et al. | 74/594.1 |
| 6,353,992 B1 | * | 3/2002 | Mizobe | 29/527.5 |
| 6,401,511 B1 | * | 6/2002 | Leng | 72/356 |
| 6,508,002 B1 | * | 1/2003 | Chiang | 29/897.2 |

* cited by examiner

*Primary Examiner*—Gregory Vidovich
*Assistant Examiner*—T. Nguyen
(74) *Attorney, Agent, or Firm*—Rosenberg, Klein & Lee

(57) ABSTRACT

A method for making a hollow crank includes a three-direction forging step to forge a piece to have a recess in a first end of the prototype; a step of forming a hollow first end of the prototype by forcing the first end through a cone-shaped passage in a mold; a step of forming the first end of the prototype to have an angle relative to the second end of the prototype; a step of setting the first end of the prototype in a cold-forging mold to set the shape of the prototype.

1 Claim, 7 Drawing Sheets

METHOD FOR MAKING HOLLOW BICYCLE CRANKS

FIELD OF THE INVENTION

The present invention relates to a method for making a hollow bicycle crank and the method uses various of molds to quickly manufacture the bicycle crank.

BACKGROUND OF THE INVENTION

A conventional bicycle crank includes two main types one of which is solid crank and the other is hollow crank. The solid crank is too heavy and needs lots of material so that it is not satisfied by the manufacturers and the customers. The hollow crank is welcomed by the market, however, it takes a long period of time to proceed and includes the steps of forging, rolling, welding and cold forging. The step of rolling especially takes a long time to finish the process. How to develop a proper method to make a hollow crank at a low cost is a concern for the manufacturers.

SUMMARY OF THE INVENTION

The present invention relates to a method for making a hollow bicycle crank and comprises a step of forging a piece by putting a piece between a first mold and a second mold. An opening is defined between the first mold and the second mold. A third mold is inserted in the opening by its prong to make a recess in a first end of the piece which becomes a prototype.

A step of forming a hollow first end of the crank by putting the first end of the forged prototype in step into a cone-shaped passage in a fourth mold. A pushing member forces the first end of the prototype to go through the cone-shaped passage from a wide opening to a narrow opening of the cone-shaped passage so as to seal the recess.

A step of thermo-forming by putting the first end of the prototype in a mold under heat and deforming the first end to have an angle relative to a second end of the prototype.

A step of setting the shape of the prototype by putting the first end of the prototype in a cold-forging mold.

The present invention will become more obvious from the following description when taken in connection with the accompanying drawings which show, for purposes of illustration only, a preferred embodiment in accordance with the present invention.

DETAILED DESCRIPTION OF THE PREFERRED EMBODIMENT

Figure 1:
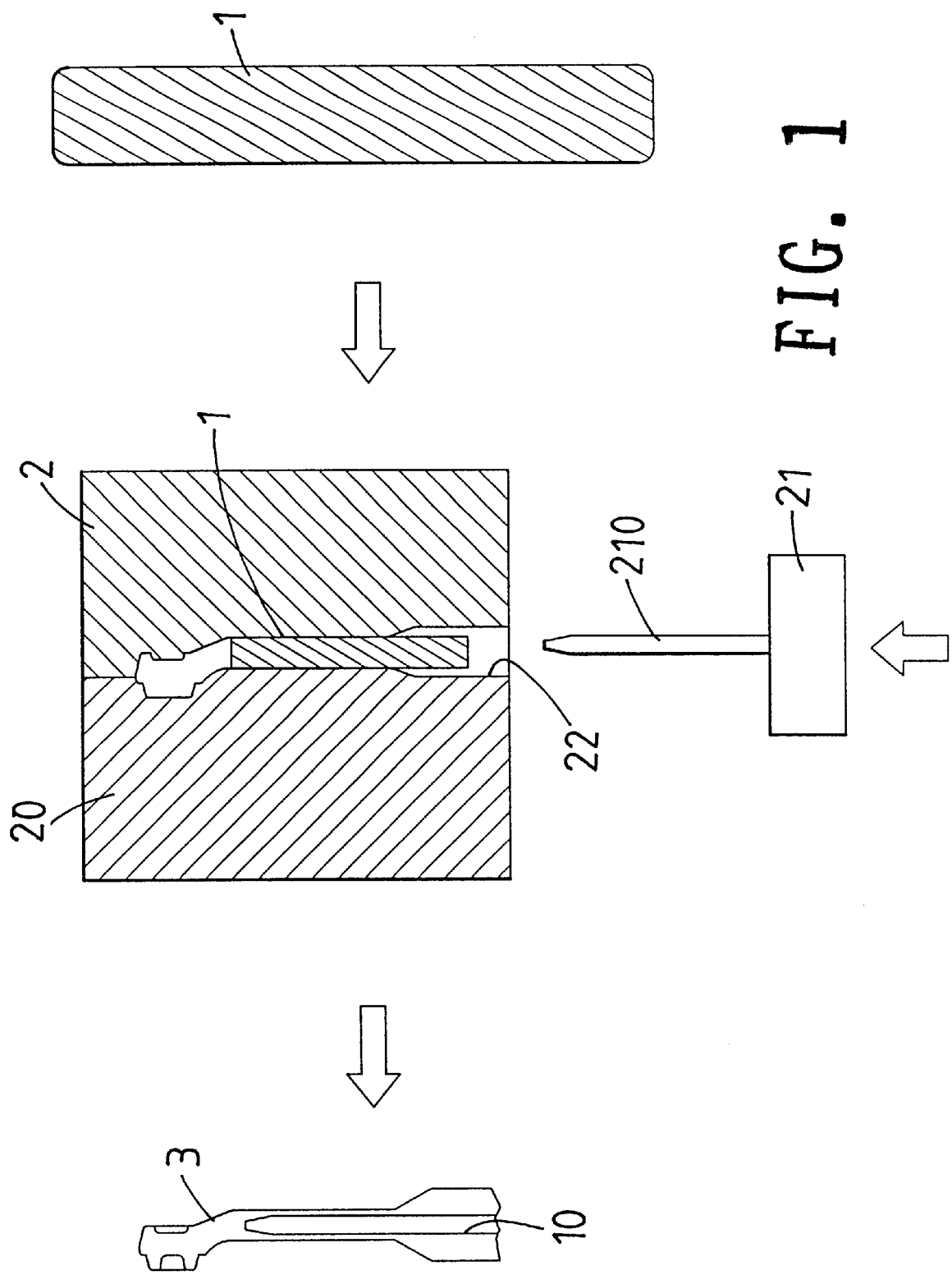
FIG. 1 shows the step of three-direction forging of the method of the present invention.

Referring to FIG. 1, the method for making a hollow bicycle crank of the present invention comprises a step of three-direction forging: forging a piece 1 by putting a piece 1 between a first mold 2 and a second mold 20. An opening 22 is defined between the first mold 2 and the second mold 20. A third mold 21 has a prong 210 which is inserted in the opening 22 to make a recess 10 in a first end of the piece which becomes a prototype 3.

Figure 2:
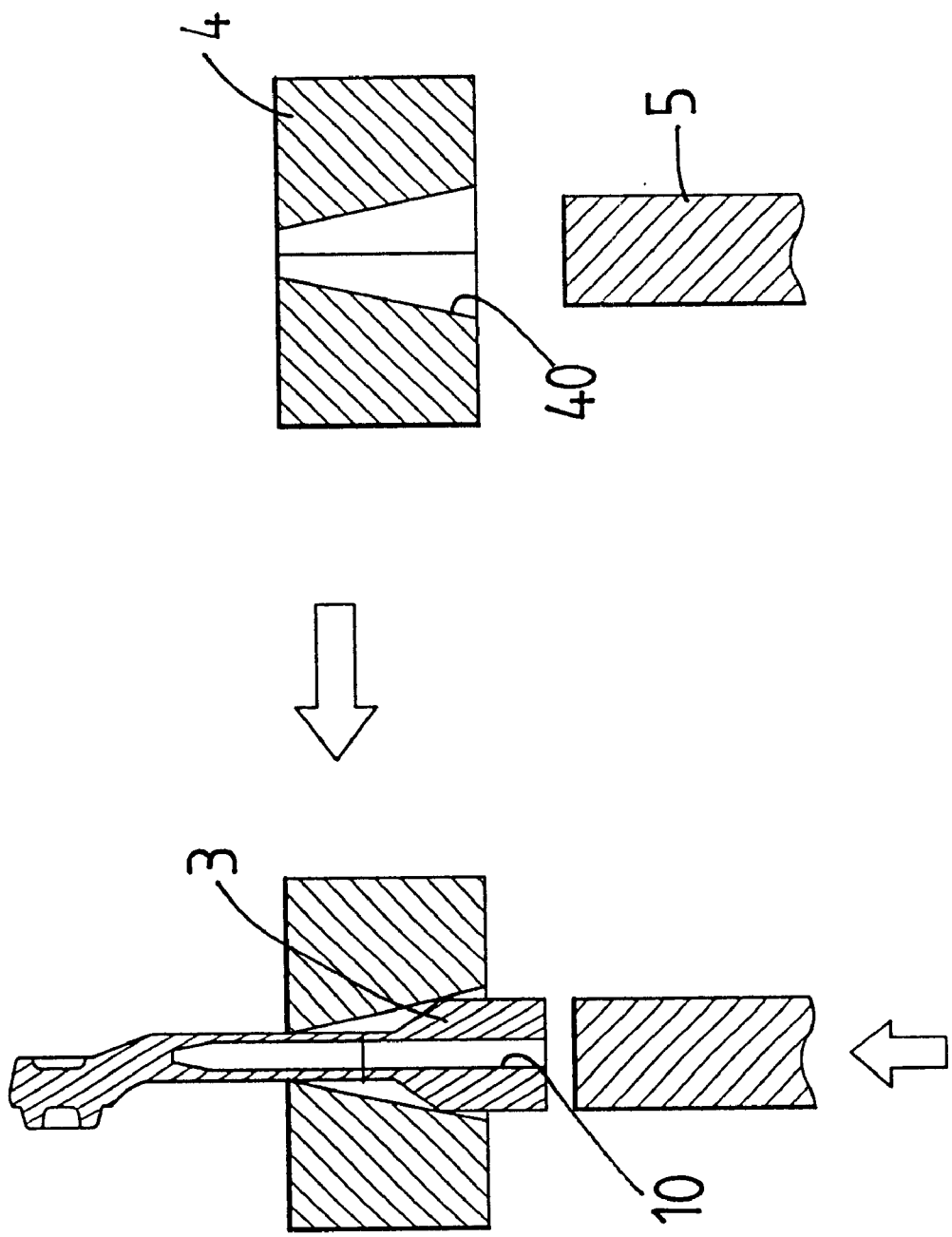
FIG. 2 shows a pushing member to push the first end of the prototype through a cone-shaped passage of a mold.
Figure 3:
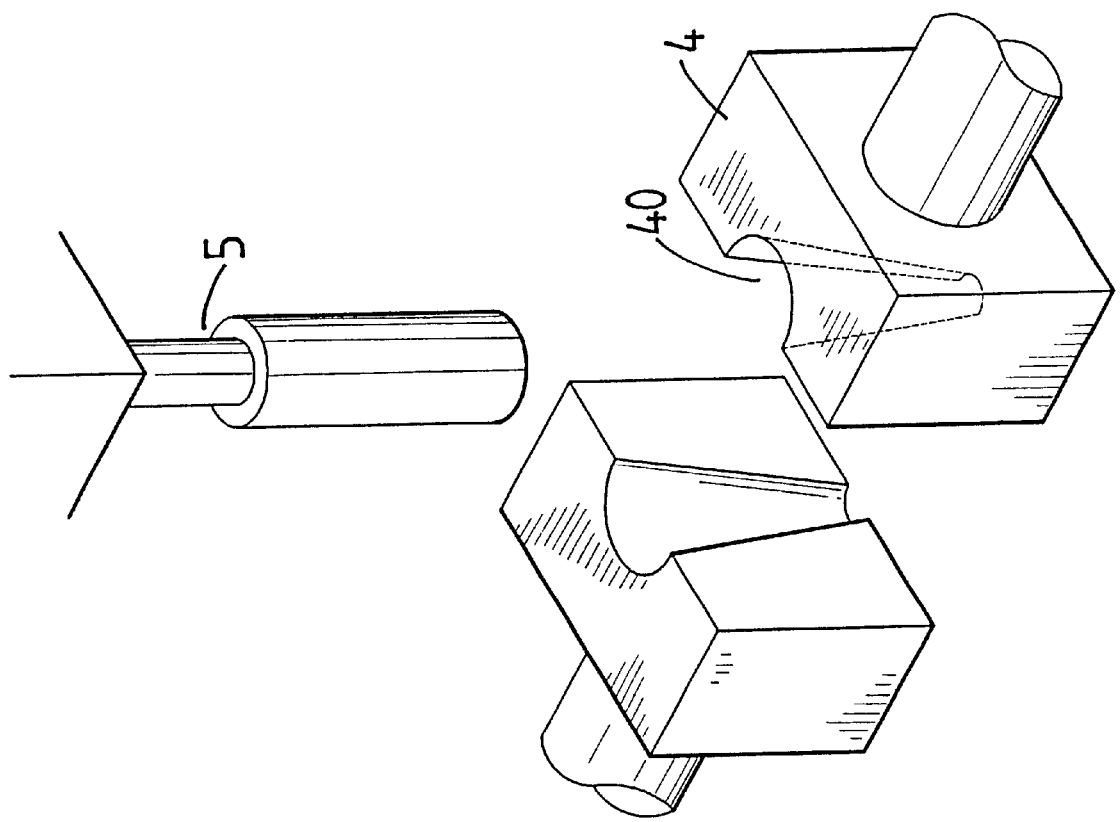
FIG. 3 shows the pushing member and the mold with the cone-shaped passage.
Figure 4:
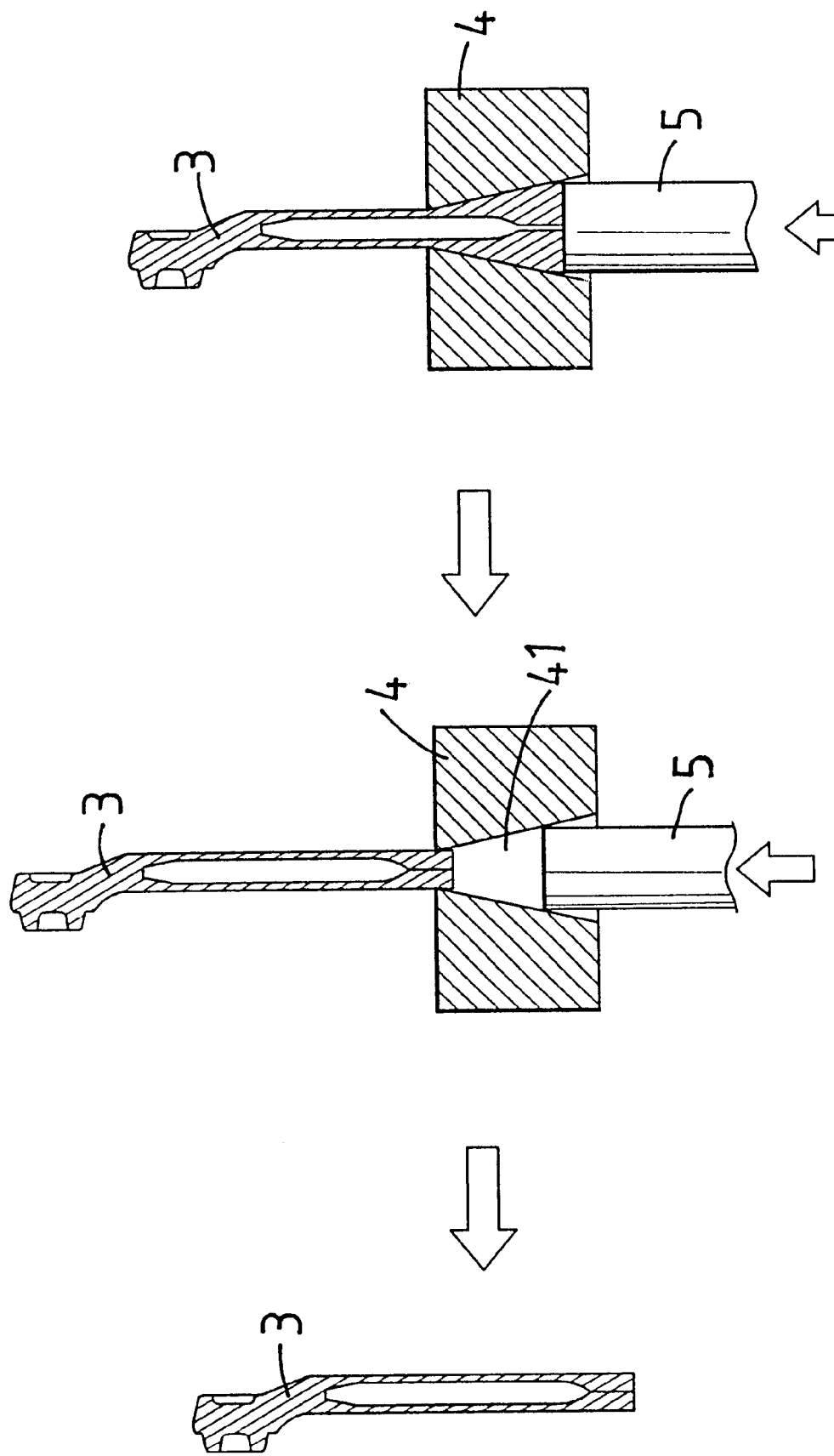
FIG. 4 shows that the first end of the prototype is sealed after being pushed through the cone-shaped passage of the mold.

Referring to FIGS. 2 to 4, a step of forming a hollow first end of the crank: putting the first end of the prototype 3 into a cone-shaped passage 40 in a fourth mold 4. The cone-shaped passage 40 includes a wide opening and a narrow opening. A pushing member 5 forces the first end of the prototype 3 to go through the cone-shaped passage 40 from the wide opening to the narrow opening of the cone-shaped passage 40. The material at the inner periphery of the recess 10 is forced to come to each other and the recess 10 is then sealed when the first end of the prototype 3 passes through the narrow opening of the cone-shaped passage 40.

Figure 5:
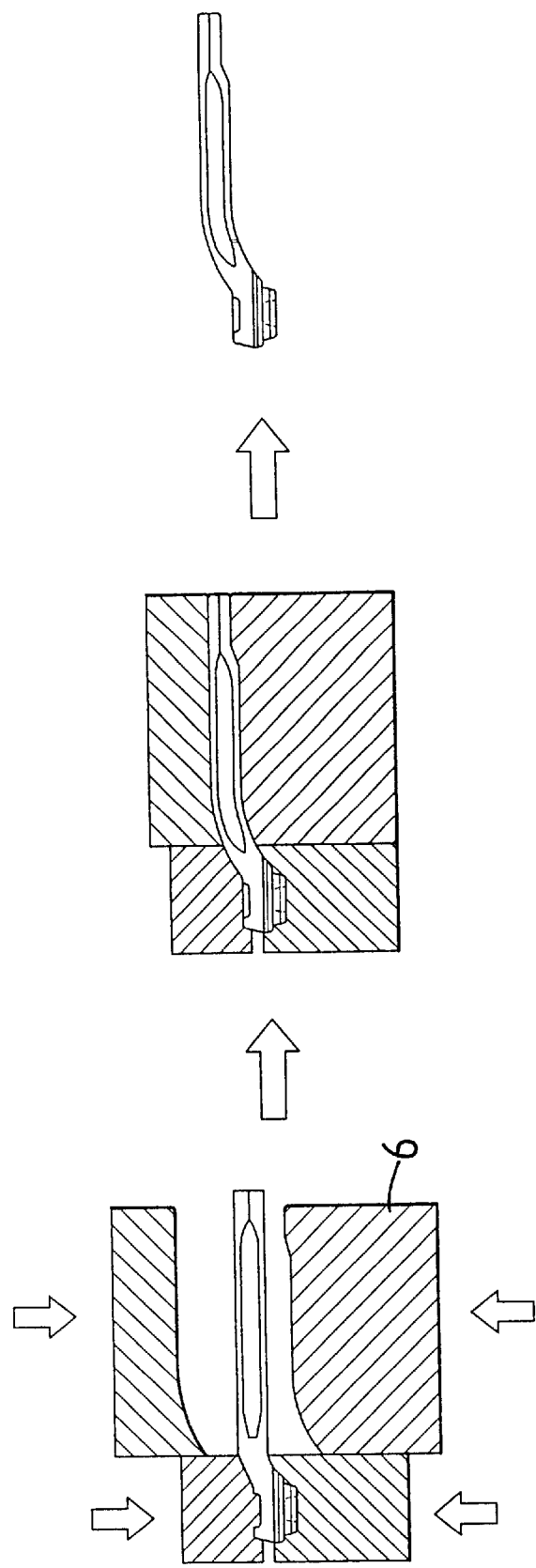
FIG. 5 shows the first end of the prototype is formed an angle by the thermo-forging mold.
Figure 6:
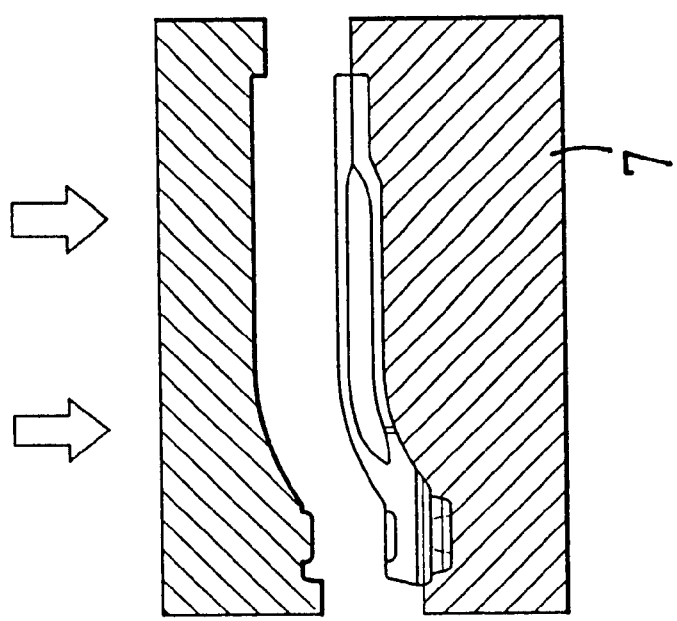
FIG. 6 shows a mold to set the shape of the first end of the piece.
Figure 7:
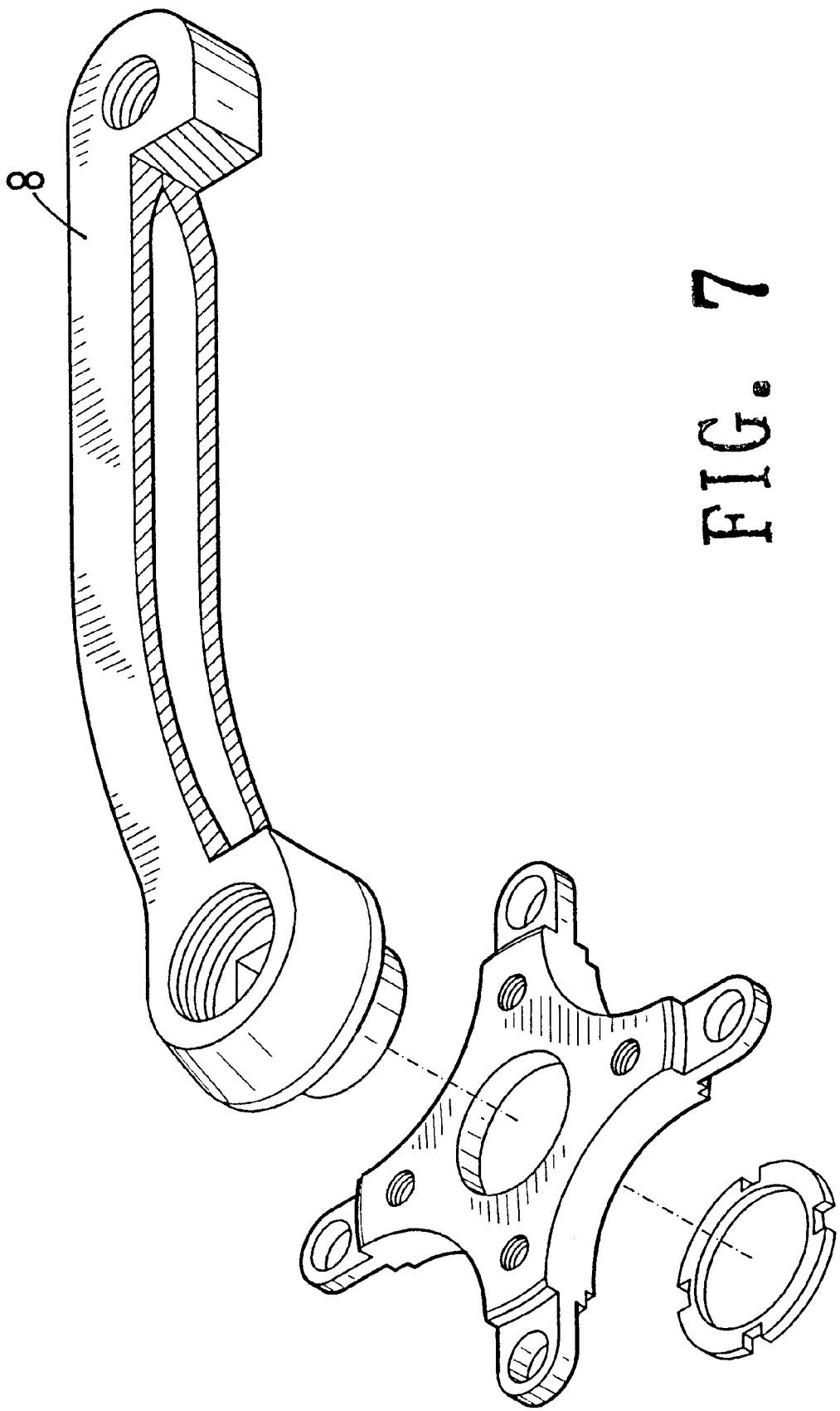
FIG. 7 is an exploded view to show the prototype and accessories to be connected to the prototype.

Referring to FIG. 5, a step of thermo-forming: putting the first end of the prototype 3 in a mold 6 under heat and deforming the first end to have an angle relative to a second end of the prototype 3. Referring to FIG. 6, a step of setting: putting the first end of the prototype 3 in a cold-forging mold 7 to set the shape of the prototype 3.

By the method of the present invention, a hollow crank 8 is made within a short period of time and two ends of the crank 8 are drilled to have threaded holes to be connected with accessories.

While we have shown and described the embodiment in accordance with the present invention, it should be clear to those skilled in the art that further embodiments may be made without departing from the scope of the present invention.

What is claimed is:

1. A method for making a hollow bicycle crank, comprising:

step of forging a prototype: forging a piece by putting a piece between a first mold and a second mold, an opening defined between the first mold and the second mold, a third mold having a prong which is inserted in the opening to make a recess in a first end of the piece which becomes a prototype;

step of forming a hollow first end of the crank: putting the first end of the forged prototype in the step of forging into a cone-shaped passage in a fourth mold, a pushing member forcing the first end of the prototype to go through the cone-shaped passage from a wide opening to a narrow opening of the cone-shaped passage, the recess being sealed when the first end of the prototype passes through the narrow opening of the cone-shaped passage;

step of thermo-forming: putting the first end of the crank in the step of forming in mold under heat and deforming the first end to have an angle relative to a second end of the crank;

step of setting: putting the first end of the crank in the step of thermo-forming in a cold-forging mold to set the shape of the crank.

* * * * *